Patented Feb. 8, 1949

2,460,896

UNITED STATES PATENT OFFICE 2,460,896

COMPOSITION FOR BLACKENING COPPER AND COPPER ALLOY SURFACES

Walter R. Meyer, Hamden, Conn., assignor, by mesne assignments, to Enthone, Inc., New Haven, Conn., a corporation of Connecticut No Drawing. Application August 19, 1944, Serial No. 550,309

5 Claims. (Cl. 148—6.14)

The present invention relates to a composition for blackening metal surfaces consisting of or comprising copper. The composition is particularly valuable for use in connection with the manufacture of range finders, periscopes, binoculars, and other optical devices having copper or copper alloy parts or elements which unless suitably coated may give rise to undesirable secondary reflection, shadow images, etc.

This application is a continuation-in-part of my copending application Serial No. 470,510 filed December 29, 1942, now U. S. Patent No. 2,364,994.

The composition of my invention comprises a pulverulent mixture, prepared as a dry mixture, of finely divided particles of sodium or potassium chlorite with finely divided particles of sodium or potassium hydroxide. This composition when dissolved in a suitable amount of water, is particularly adapted for coloring copper or copper alloy surfaces a deep black.

Heretofore, copper and copper alloy surfaces have been blackened by the so-called "oxidizing process" in which the surface is cleaned and a copper sulphide film is formed by immersing the surface in solutions of sodium sulphide or ammonium sulphide or other water soluble sulphides. This produced brown or black coatings on the surface. These sulphide films are not stable with respect to oxidation, particularly when exposed to outdoor atmospheres, and have to be protected by subsequent treatments, such as lacquering or waxing, to provide a protective coating thereover which must be renewed from time to time.

Another process involves the use of a copper salt, such as copper sulphate, copper carbonate, or basic copper carbonate with ammonia in a bath. This process is used for applying blue black to brass (copper zinc alloys) in the range of 65—35 to 80—20 copper zinc ratios by weight. In proper operation of this process, when copper carbonate is employed, for example, an excess of copper carbonate is required. Alloys containing higher copper contents than 80%, particularly the pure copper, are not blackened by this process to a deep black, but are colored a grayish black.

Still another method of blackening copper and copper alloys involves the use of sodium, potassium or ammonium persulphates, together with an alkali, such as sodium hydroxide or potassium hydroxide. This method, however, is very unsatisfactory because the persulphates are unstable and the life of the solution is relatively short, i. e., one to eight hours.

Baths prepared using my composition are stable over a period of days and weeks and give long lasting coatings affording excellent protection against atmospheric influences.

I prefer to prepare my composition by simply mixing powdered anhydrous chlorite with finely flaked and substantially anhydrous caustic soda in any suitable mixing device such as an ordinary mixing drum of the type designed for the intimate admixing of fine powders. Caustic is hygroscopic, and consequently I cannot describe my mixture as indefinitely anhydrous, but my composition is dry in the sense that any water absorbed by the caustic in handling does not render the composition liquid. My composition, essentially, is a pulverulent mixture of solid chlorite and solid caustic. Ordinarily I employ about one part chlorite and about two parts caustic, but other ratios, for example, equal amounts of chlorite and caustic, may be used. Although the composition is much less hygroscopic than sodium or potassium hydroxide unmixed with chlorite, it is preferably kept out of contact with moisture in order to avoid any tendency toward caking.

Unlike sodium or potassium chlorite unmixed with caustic, my composition is not explosive upon percussion in the presence of organic matter and does not markedly increase the inflammability of ordinary fabrics when permitted to remain in contact therewith. Also the composition is less reactive with sulfur and when brought into contact with acid is less prone to give off dangerous amounts of chlorine dioxide. Metal surface treatments almost always involve the use of acid solutions and this last characteristic of my composition is therefore particularly advantageous in a surface blackening compound. For example, spilled on the floor of a plating room, my composition does not involve the risk of chlorine dioxide liberation that would be involved if the chlorite, handled separately, were so spilled.

In making up the copper-blackening bath using the composition containing one part by weight of chlorite and two parts by weight of caustic, I usually employ from one to two pounds of the composition for each gallon of water. A bath of the indicated concentration is most preferably operated at a temperature between 200° F. and 212° F. The water may or may not be preheated to the operating temperature before the composition is dissolved therein.

To insure uniformity in the blackened surface produced according to the invention, the copper or copper alloy surface is preferably subjected to a cleaning treatment as with acid before it is immersed in the coating bath. Any of the well known sulfuric acid-nitric acid bright dips, various concentrations of nitric acid in water, or etches containing chromic acids, chromates or dichromates, with sulfuric acid may be used. Subsequent to the acid treatment and prior to immersion in the coating solution the piece is best thoroughly washed with water.

One requirement of a bath prepared according to the invention is that a minimum pH must be exceeded. This minimum pH is that indicated by the concentration of an aqueous solution of sodium hydroxide or potassium hydroxide of about 10 g./l. Such minimum limit is substantially constant but varies slightly with the concentration of chlorite and with the temperature.

Coatings produced by solutions containing high concentrations of hydroxide (above 200 g./l.) are characterized in that the black film is covered by a tan smut. Although this smut can be easily wiped off to expose the black surface, in normal commercial operation the caustic concentration is usually maintained sufficiently low so that the smut does not appear. A bath prepared and operated as above will not give the tan smut.

It has been found that satisfactory deep black coatings can be obtained in aqueous solutions having concentrations ranging between the following limits: sodium chlorite-5 g./l., sodium hydroxide-10 g./l. to sodium chlorite-saturated solution, sodium hydroxide-1000 g./l., that is, from about one part of chlorite to two parts of hydroxide to one part chlorite to from 200 to 330 parts of hydroxide. The lower range of concentration requires approximately thirty minutes to blacken copper surfaces with the solution operating at boiling point, whereas copper surfaces blacken in solutions of the high limits in approximately one minute when operated at boiling point. These examples are for pure copper surfaces. Usually somewhat higher temperatures and concentrations are employed for blackening copper alloys.

The temperature required for the coating operation varies with the concentration of the component chemicals, the high concentrations permitting lower temperatures to be used. For example, with a concentration of sodium hydroxide of 10 g./l. and sodium chlorite at 10 g./l. a black color was obtained upon a copper surface at 175° F. in eighteen minutes, whereas with a concentration of sodium hydroxide 150 g./l. and sodium chlorite 150 g./l. a black was obtained upon a copper surface in fifteen minutes at 125° F.

By increasing the temperatures, the time required to produce the black surface may be effectively shortened. For example, the concentration of sodium hydroxide 10 g./l. and sodium chlorite 10 g./l. can produce a black surface on copper in ten minutes if the temperature is raised to a boiling point of 216° F., and with the concentration of sodium hydroxide 150 g./l. sodium chlorite 150 g./l., black can be obtained in thirty seconds if the temperature of the bath is raised to the boiling point of the solution, namely, 250° F.

The present invention is not limited to coating articles of solid copper or copper alloys, but may be used to coat surfaces of other metals which have been plated with copper or copper alloys when the coating thickness is greater than 0.00005" and the copper content of the alloy is greater than 60%.

I claim:

1. As a composition of matter, a dry pulverulent mixture consisting essentially of a chlorite of the group consisting of sodium chlorite and potassium chlorite and an alkali metal hydroxide of the group consisting of sodium hydroxide and potassium hydroxide, the relative proportions by weight being within the range of about one part chlorite per part of the hydroxide to one part chlorite for each two hundred parts of the hydroxide.

2. As a composition of matter, a dry pulverulent mixture consisting essentially of sodium chlorite and sodium hydroxide, in proportions by weight within the range of about one part to two parts of the hydroxide per part of the chlorite.

3. A composition according to claim 2 containing about one part by weight of the chlorite and about two parts by weight of the hydroxide.

4. As a composition of matter, a dry pulverulent mixture consisting essentially of potassium chlorite and potassium hydroxide in proportions by weight within the range of about one part to two parts of the hydroxide per part of the chlorite.

5. A composition according to claim 4 containing about one part by weight of the chlorite and about two parts by weight of the hydroxide.

WALTER R. MEYER.

REFERENCES CITED

The following references are of record in the file of this patent:

UNITED STATES PATENTS

| Number | Name | Date |
|---|---|---|
| 1,339,783 | North | May 11, 1920 |
| 1,811,699 | Scott | June 23, 1931 |
| 1,961,576 | Taylor | June 5, 1934 |
| 2,145,062 | Taylor et al. | Jan. 24, 1939 |
| 2,364,993 | Meyer | Dec. 12, 1944 |

FOREIGN PATENTS

| Number | Country | Date |
|---|---|---|
| 330,699 | France | July 3, 1903 |

OTHER REFERENCES

Kingzett, "Chemical Encyclopedia," 3rd edition, 1924, Van Nostrand Co., New York, page 179.